March 20, 1934.  H. H. HENRY ET AL  1,951,932
GRID FORMING MECHANISM
Filed July 13, 1932  5 Sheets-Sheet 1
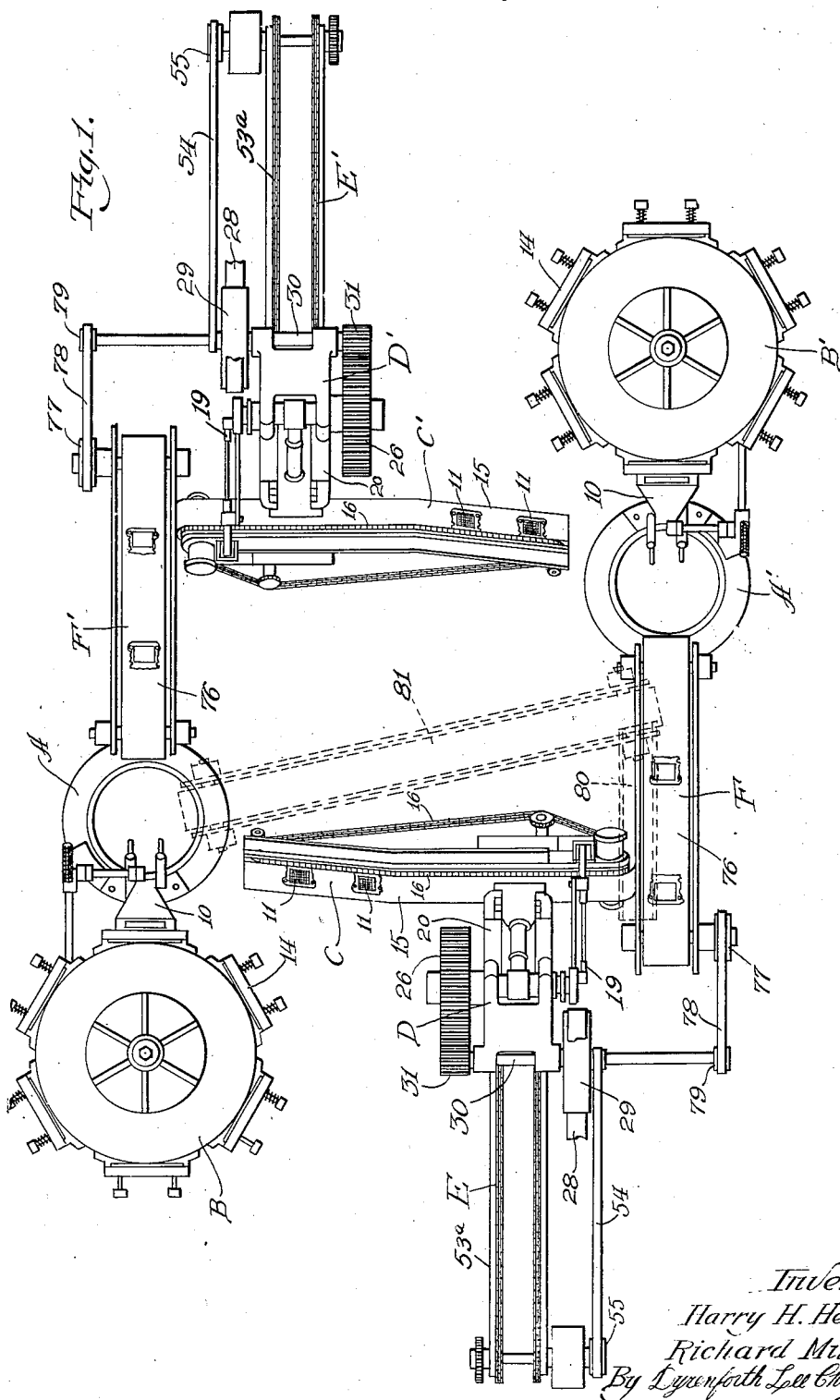

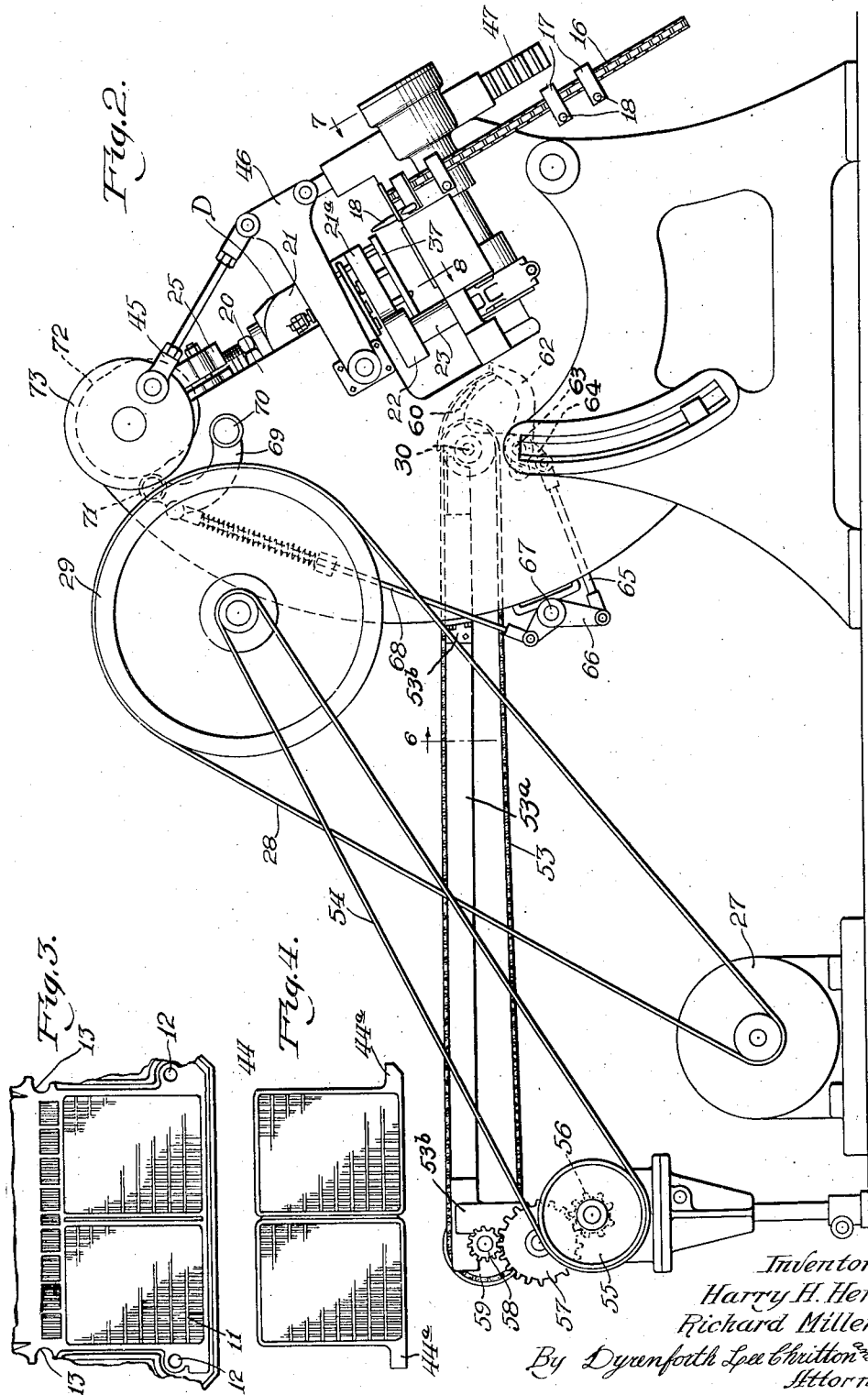

March 20, 1934.  H. H. HENRY ET AL  1,951,932
GRID FORMING MECHANISM
Filed July 13, 1932   5 Sheets-Sheet 3
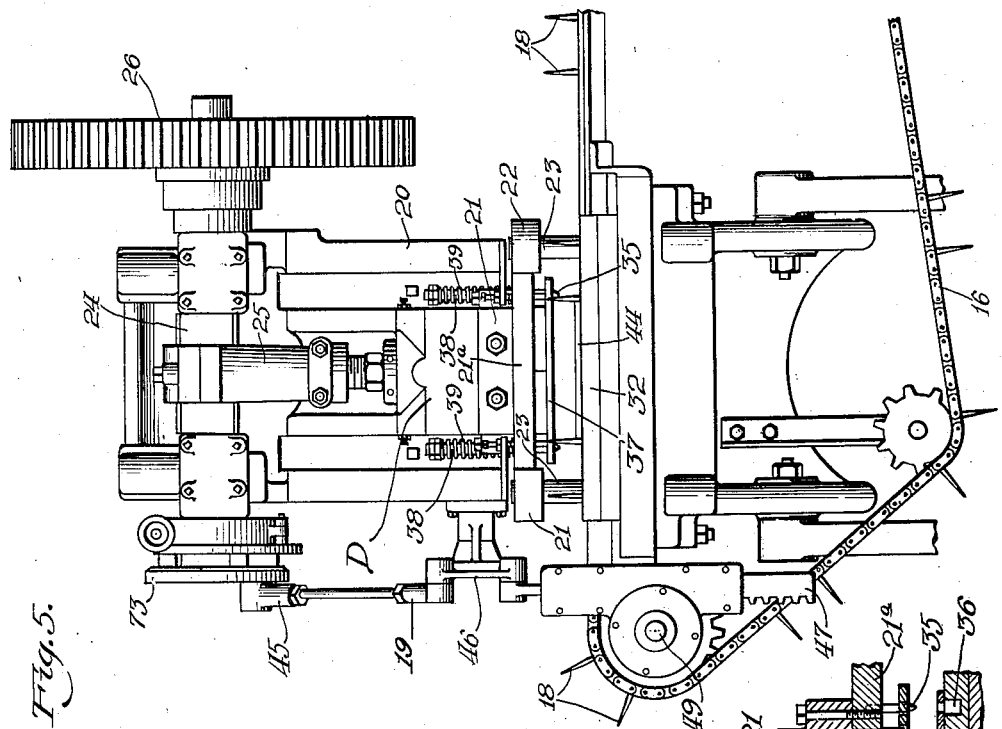
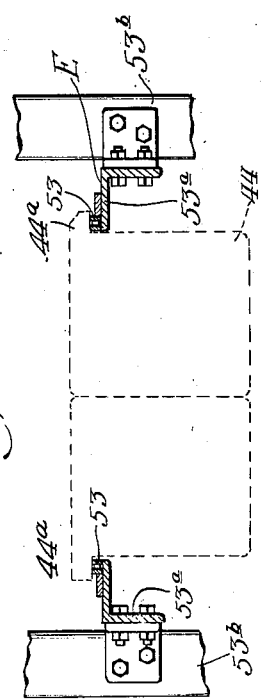
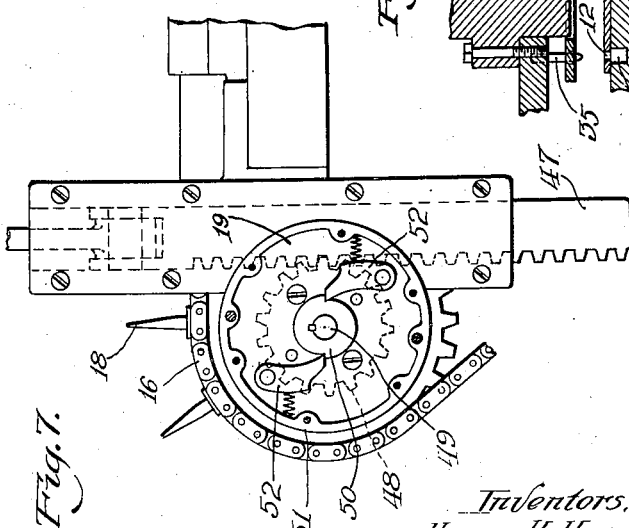
Inventors:
Harry H. Henry
Richard Millenaar
By Dyrenforth Lee Chritton Wiles
Attorneys March 20, 1934.   H. H. HENRY ET AL   1,951,932
GRID FORMING MECHANISM
Filed July 13, 1932    5 Sheets-Sheet 4

Inventors;
Harry H. Henry
Richard Millenaar
By Dyrenforth Lee Chritton & Wiles
Attorneys March 20, 1934.    H. H. HENRY ET AL    1,951,932
GRID FORMING MECHANISM
Filed July 13, 1932    5 Sheets-Sheet 5

Inventors:
Harry H. Henry
Richard Millenaar
By Dyrenforth Lee Chritton and Wiles
Attorneys Patented Mar. 20, 1934

1,951,932

UNITED STATES PATENT OFFICE 1,951,932

GRID-FORMING MECHANISM

Harry H. Henry, Chicago, and Richard Millenaar, Oak Park, Ill., assignors to Monark Battery Company, Inc., Chicago, Ill., a corporation of Delaware Application July 13, 1932, Serial No. 622,354

13 Claims. (Cl. 29—2)

This invention relates to grid-forming mechanism and, more particularly, to mechanism for forming grids employed in storage batteries, and the like.

An object of the invention is to provide improved mechanism by which the grids, after being separated from the scrap, are conveyed away in a separate path. Another object is to provide improved conveyor mechanism by which the scrap, after separation from the grids, is conveyed on to a desired location and the grids are stacked in vertical position on separate conveyor apparatus. A further object is to provide a cyclic process and mechanism by which the casting, pressing or separating, conveying and stacking operations are carried on continuously.

Other specific objects and advantages will appear as the specification proceeds.

The invention is illustrated in its preferred embodiment, in the accompanying drawings, in which—

Figure 9:
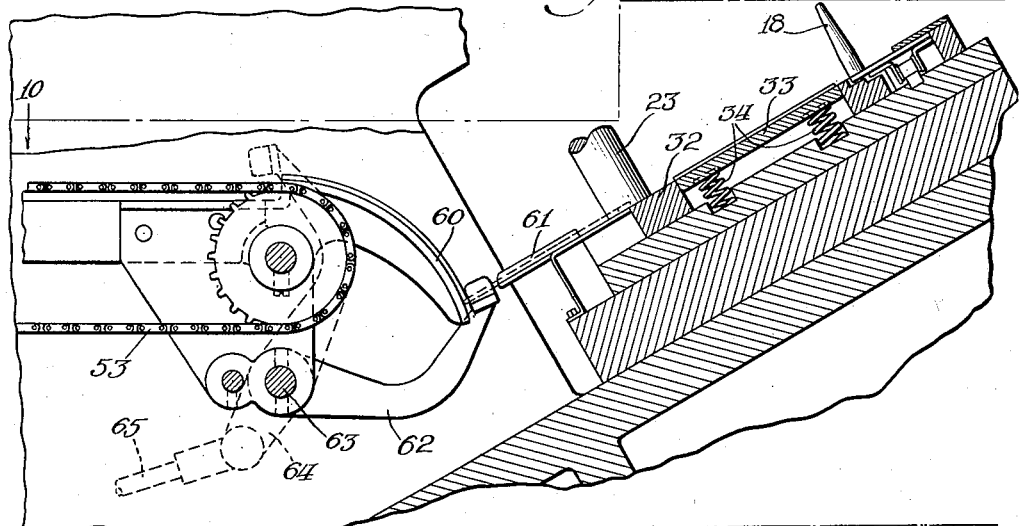
Figure 10:
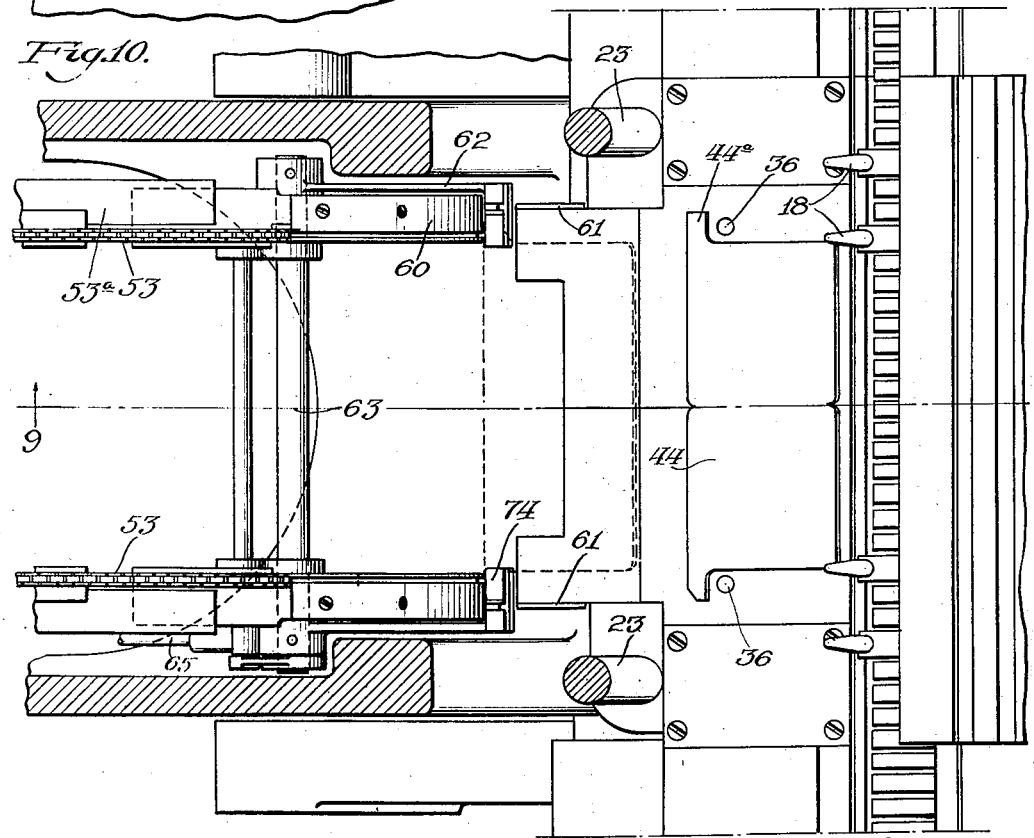
Figure 11:
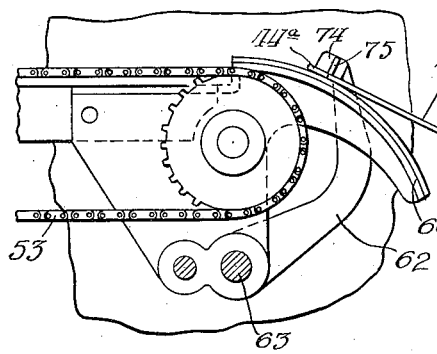
Figure 12:
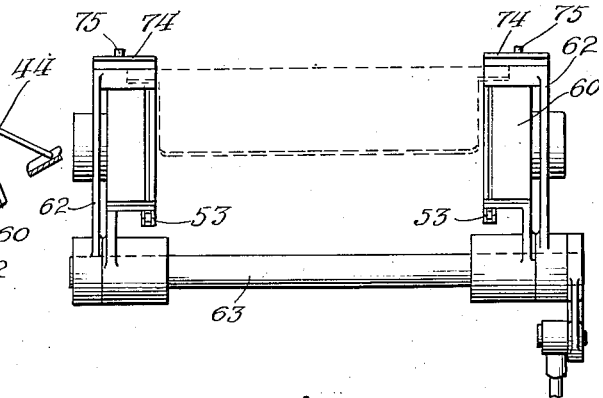
Figure 13:
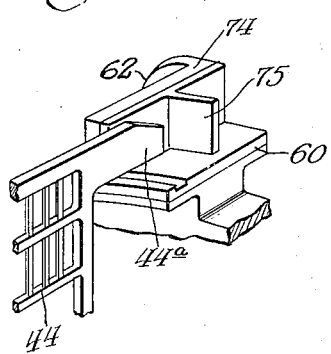
Figure 15:
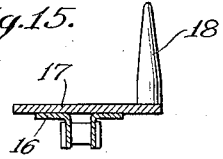
Figure 14:
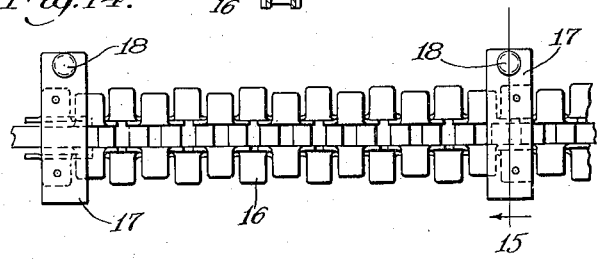
Figure 16:
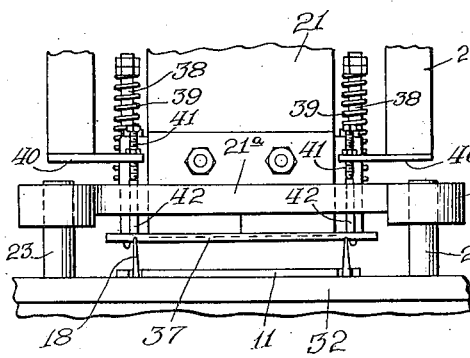

Figure 1 is a plan view of apparatus embodying our invention; Fig. 2, a side view in elevation; Fig. 3, a plan view of a grid casting after leaving the casting machine; Fig. 4, a plan view of the grid after leaving the press; Fig. 5, a front view in elevation of the press and a portion of the conveyor apparatus; Fig. 6, a detail sectional view, the section being taken as indicated at line 6 of Fig. 2; Fig. 7, an enlarged sectional detail view, the section being taken as indicated at line 7 of Fig. 2; Fig. 8, an enlarged detail sectional view, the section being taken as indicated at line 8 of Fig. 2; Fig. 9, a transverse sectional view, the section being taken as indicated at line 9 of Fig. 10; Fig. 10, a plan and part-sectional view, the section being taken as indicated at line 10 of Fig. 9; Fig. 11, a side view in detail of the grid-stacking mechanism shown in Fig. 9; Fig. 12, a rear view of the grid-stacking mechanism; Fig. 13, a broken detail view in perspective of a portion of the grid-stacking mechanism; Fig. 14, a plan view of the conveyor chain employed; Fig. 15, a transverse sectional view, the section being taken as indicated at line 15 of Fig. 14; Fig. 16, a front view in elevation of the press, the press plunger being shown in raised position; and Fig. 17, a similar view of the press, the plunger being shown in lowered position.

In the illustration given, A indicates a lead-melting pot; B, a casting machine; C, a conveying apparatus; D, a press; E, grid-stacking mechanism; F, a scrap conveyor; and A', B', C', D', E' and F' represent apparatus similar in all respects to that designated by the letters A, B, C, D, E and F.

As illustrated more clearly in Fig. 1, the parts A, B, C, D, E and F are so arranged with respect to parts A', B', C', D', E' and F" that a cyclic operation may take place. That is, lead is drawn from the pot A into the casting machine B; the grid casting is conveyed by the apparatus C to the press D, the separated grids being removed by the stacking mechanism E; and the scrap is conveyed on to the apparatus F by which it is delivered to the melting pot A'. Similarly, castings are formed in the mechanism B' from material drawn from pot A'; the castings are delivered to the conveyor C' and the separated grids stacked by the mechanism E'; and the scrap is conveyed by apparatus F' to the lead-melting pot A.

Most of the apparatus shown in the drawings is well known to those skilled in the art and need not be described in detail. Such apparatus will be identified briefly and only the novel elements or elements related directly to the improvements herein claimed will be described in detail.

The melting pot A is of well-known construction. Means 10, of well-known construction, are provided for drawing measured amounts of lead into the casting machine B.

The casting machine B is also of well-known construction and need not be described in detail. In the molds of the casting machine are formed the grid castings 11, as illustrated more clearly in Fig. 3. Each of the castings is provided near one end with a centering or guide hole 12 and at the other end, with securing indentations 13. As is well known to those skilled in the art, the machine B rotates and the finished grid casting is removed at 14 by the operator. The casting 11 is then placed upon the conveyor apparatus C.

The conveyor apparatus C preferably comprises a stationary platform 15. Mounted adjacent the outer edge of the platform is an endless chain 16. The chain, as shown more clearly in Figs. 14 and 15, is provided at intervals with cross plates 17 to which are secured vertical prongs 18. The prongs 18 are so spaced that the indentations 13 of the casting will engage the adjacent sides of two spaced prongs. By this means, the casting is securely supported upon the chain 16 and is conveyed along platform 15. The conveyor is provided with actuating means 19 by which the chain is moved forward intermittently. A brief description will be given later of the actuating means, although such means are well known in the art.

The press D illustrated is of well-known construction. Briefly, it consists of a frame 20 in which is mounted a press head 21 equipped with laterally extending guide arms 22. The guide arms 22 are perforated to receive guide pins 23. A crank shaft 24 mounted in the top of the press is employed to reciprocate the press arm 25. The crank 24 is driven by the gear 26.

The means employed to drive the gear 26 are also well known in the art. As shown more clearly in Figs. 1 and 2, the motor 27 drives, by means of belt 28, the pulley wheel 29. The wheel 29 is mounted upon shaft 30, which is supported within frame 20 and carries a pinion 31 which meshes with gear 26.

The platform 32 of the press is provided with a floating plate 33 mounted upon springs 34. When the plunger of the press descends, the plate 33 yields to permit the severance of the grid from the scrap, an operation well known in the art. As will be observed more clearly from Figs. 1, 2, 9 and 10, the entire bed 15 of the conveyor apparatus C and the platform 32 of the press D are inclined so that if the grid castings were not supported by the prongs 18, they would slide off the bed or platform toward the grid-stacking mechanism E.

In order to center the casting for the severing operation, the head 21 is provided with fixed centering pins 35 which are adapted to engage the guide openings 12 of the casting 11. The platform 32 is perforated at 36 to receive the centering pins 35. In the operation of the press, the guide pins strike the centering holes 12 before the plunger severs the grid from the scrap.

Figure 17:
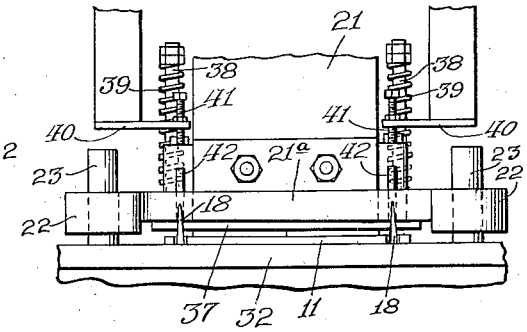

In order to carry out our invention for the separation of the grids and scrap, we desire to have the scrap lifted by the press head so as to permit the discharge of the grid, and this is accomplished by the frictional engagement of the head with the scrap after the head has passed through the casting, and then we desire to return the scrap to the prongs of the chain conveyor 16 so that the conveyor may continue along its travel with the scrap secured thereto. For this purpose, a stripper plate 37 is employed. The plate 37 is apertured centrally to permit the plunger of the press to move therethrough. It is supported by means of pins 38 and springs 39. The springs 39 engage the heads of the pins 38 and rest upon the lower flange 21$^a$ of the head 21. The springs thus urge the stripper plate in an upward direction. In order to check the upward movement of the stripper plate 37 as the press head rises, we employ stop means which check the upward movement of the stripper plate and cause it to force the scrap downwardly upon the prongs 18. The stop means, as shown more clearly in Figs. 16 and 17, include inwardly-turned bracket members 40 which are supported by the frame of the press. To the bracket members are secured adjustable screws 41. The lower ends of the screws are adapted to engage the ends of studs 42 secured to the stripper plate 37. In Fig. 17, the screw 41 and stud 42 are shown in separated position, the stripper plate resting upon the grid casting 11. In Fig. 16, the screw 41 and stud 42 are shown in contact, the upward movement of the stripper plate having thus been arrested and the scrap 43 having been stripped off and returned to the prongs 18. While the scrap 43 was held in raised position, as it followed the upward travel of the press head, the severed grid 44, being released from the scrap 43 confined on prongs 18, slid down the inclined platform 32 toward the grid-stacking mechanism E.

The actuating means for the conveyor 16, as illustrated in the drawings, is well known and will be identified very briefly. Eccentrically pivoted to the outer end of the crank shaft 24 is a connecting rod 45 connected through the rocking member 46 to a sliding rack 47. The rack 47 operates the gear 48 in opposite directions as the rack reciprocates. Upon the shaft 49 by which gear 48 is carried is mounted a ratchet 50. A floating wheel 51 is also mounted upon shaft 49 and is provided with pawls 52. The pawls 52 actuate the wheel 51 as the rack moves in one direction but are idle, sliding over the ratchet teeth, when the rack moves in the opposite direction. In this way, the conveyor chain 16 is moved intermittently in a forward direction.

The grid-stacking mechanism E is preferably so constructed as to take the severed grid 44 as it slides from the platform 32 and place it in a vertical position upon a slowly moving conveyor chain 53. The apparatus is shown more clearly in Figs. 9, 10, 11, 12 and 13. A pair of endless chain conveyors 53 is supported in spaced relation so as to engage the lateral projections 44$^a$ of the finished grid 44. As shown more clearly in Fig. 6, the chains 53 are supported upon brackets 53$^a$ secured to the frame members 53$^b$. The conveyor may be driven by belt 54 driven by the wheel 29$^a$ and engaging pulley wheel 55, wheel 29$^a$ being mounted on the same shaft with wheel 29. The pulley wheel is provided with a pinion 56 which drives through intermediate gears 57 and 58 the sprocket wheels 59. Supported by the frame of the press and alined with the chains 53 are curved tracks 60. The tracks 60, as shown more clearly in Fig. 9, extend downwardly to a point adjacent the lower end of the bed of the platform 32 so as to engage the lateral projections 44$^a$ of grids 44. Preferably, lateral guides 61 are secured to the platform 32 so as to direct the grids upon the tracks 60. Suitable mechanism is provided for swinging the lateral projections 44$^a$ of grids 44 upwardly along tracks 60 to the conveyor chains. As shown more clearly in Figs. 2 and 9, a swing arm 62 is pivotally mounted upon shaft 63 and is provided with an integral extension lever 64. Secured to the end of extension 64 is a connecting rod 65 which engages a bell crank 66 mounted upon shaft 67. The bell crank 66 is actuated by a long connecting rod 68 which is pivotally secured at its upper end to a curved cam arm 69. The arm 69 is pivotally mounted upon shaft 70. The curved arm 69 is provided with a roller 71 which engages a cam 72 carried by the wheel 73 which is carried by a crank shaft 24. As the arm 69 is swung inwardly and outwardly by contact with the cam 72, the crank shaft 66 is actuated and thereby the swinging arms 62 are swung upwardly along tracks 60. As shown more clearly in Fig. 13, the ends of the arms 62 are provided with flanges 74 which extend across the tracks 60 and with right angle flanges 75 which abut the outer edges of the grid projections 44$^a$.

The scrap conveyor apparatus F may consist of an endless belt 76, or other suitable means, for conveying the scrap removed from the conveyor apparatus 16 to the melting pot A'. As illustrated, the belt 76 is driven by a pulley 77 which, in turn, is driven by a belt 78 trained about pulley wheel 79 on the shaft of the pulley wheel 29.

The apparatus A', B', C', D', E' and F' is identical with the apparatus A, B, C, D, E, and F already described and the apparatus is arranged as illustrated in Fig. 1.

In the operation of the apparatus, the molten lead in the pot A is drawn in a measured amount through the apparatus 10 into the molds of the casting machine B. As the machine B rotates, the casting is removed at the point 14 by the operator. The operator places the casting 11 upon the inclined bed 15 so that the lateral indentations 13 engage a pair of spaced prongs 18. The chain 16 is driven intermittently in a forward direction by well-known apparatus and carries the castings to the press. As the casting reaches the press, the press head is lowered, bringing the centering pins 35 into contact with the guide openings 12 with which the castings are provided. The plunger of the press then strikes the grid and severs the scrap from the grid, as the plate 33 yields. The press head then rises, carrying with it the scrap 37. The severed grid 44, being no longer held by the scrap in contact with the prongs 18, slides down the inclined platform 32 and is guided by flanges 61 onto the curved tracks 60. The swing members 62 then engage the lateral projections 44ª of the grid 44 and force them along inclined tracks 60 and onto the endless chains 53 which are alined with the tracks 60. Preferably, the chains 53 are driven quite slowly so as to permit the grids to be stacked compactly thereon.

The scrap, after the severing operation, is raised by the press head until the stud 42 carried by the stripper plate 37 engages the screw 41 on bracket 40. The upward movement of the stripper plate is thus checked and the scrap is forced back upon the prongs 18. The conveyor 16 carries the scrap onto the scrap conveyor F. The latter, as shown more clearly in Fig. 1, deposits the scrap in the melting pot A'.

From the melting pot A', the operation is the same through the succeeding apparatus B', C', D', E' and F' so that the finished grids are conveyed away in stacked and compact relation on the apparatus E' and the scrap is returned by conveyor F' to the melting pot A.

If desired, suitable conveyor apparatus may be employed for returning the scrap directly from the chain conveyor 16 to the melting pot A, thereby providing a cyclic process without the use of the duplicate apparatus A', B', C', D', E' and F'. As shown in dotted lines in Fig. 1, a slide 80 may be supported below the end of the conveyor chain 16 so as to discharge the scrap upon a conveyor 81. The conveyor 81 carries the scrap to the melting pot A.

With the apparatus described, it will be observed that the operation is continuous and cyclic. Also, instead of discharging the grid and scrap together, as has heretofore been the practice, the scrap and grids follow different paths, the grids being stacked compactly on one side of the press and the scrap being conveyed in the same direction and then deposited by conveyor apparatus into the next melting pot. The apparatus is efficient, accurate and results in the saving of time and labor.

The foregoing description has been given for clearness of understanding only, and no unnecessary limitations should be understood therefrom but the appended claims should be construed as broadly as permissible, in view of the prior art.

We claim:

1. In apparatus for finishing grid castings provided with openings, conveyor means equipped with projections adapted to engage said openings, a press for separating the grids from the scrap and for raising said scrap, means for removing the grids, and means associated with said press for retaining the scrap on the conveyor projections.

2. In apparatus for finishing grid castings provided with openings, conveyor means equipped with projections adapted to engage said spaced openings in the castings, a press for separating the grids from the scrap and for raising said scrap, means for removing the grids, a stripper plate, and stop means associated with said stripper plate and cooperating therewith to retain the scrap on the conveyor projections.

3. In apparatus for finishing grid castings provided with openings, conveyor means equipped with projections adapted to engage said openings in the castings, a press for separating the grids from the scrap and for raising said scrap, said press being provided with an inclined platform, and means associated with said press for retaining the scrap on the conveyor projections after the separating operation.

4. In apparatus for finishing grid castings provided with openings, an endless belt equipped with projections adapted to engage said spaced openings in the castings, a press for separating the grids from the scrap and for raising said scrap, said press being provided with an inclined platform, centering pins carried by said press and adapted to engage openings in said castings, means for stripping the scrap from the press head after it has been raised, and means for removing separately the finished grids.

5. In combination an inclined bed adapted to receive grids equipped with lateral projections, upwardly curved tracks at the lower side of said bed and adapted to engage the lateral projections of the grids, chain conveyors alined with said tracks, a swing arm adapted to move said grids upon said track and onto said chain conveyors, and means for actuating said arm.

6. In combination an inclined bed adapted to receive grids equipped with lateral projections, guide means adapted to engage the lateral projections of the grids, upwardly curved tracks at the lower side of said bed and alined with said guides, chain conveyors alined with said guides, swinging arms adapted to move said grids upon said tracks, and means for actuating said arms.

7. In combination with a press having an inclined platform adapted to receive grid castings, conveyor means for bringing said grid castings to said platform, and means for severing the grids from the scrap and for raising the scrap, said inclined platform being below said severing means and causing the grids to slide to one side while the scrap is raised.

8. In apparatus of the character set forth, a press equipped with an inclined platform, conveyor means for bringing grid castings to said grid press and for conveying scrap therefrom, and means for severing the grids from the scrap and for raising the scrap, said inclined platform causing the grids to slide laterally from said scrap during the interval that the scrap is raised.

9. In apparatus of the character set forth, conveyor means for grid castings, means for severing the grids from the scrap while yet engaging said conveyor means and for raising said scrap, and means for removing said grids separately while the scrap is raised.

10. In apparatus of the character set forth, conveyor means adapted to convey grid castings having a grid portion and a scrap portion, retaining means for releasably securing the scrap portion of the grid castings to said conveyor, means for severing the grids from the scrap and for raising said scrap, and means for removing said grids while said scrap is raised.

11. In apparatus of the character set forth, conveyor means adapted to convey grid castings having a grid portion and a scrap portion, retaining means for releasably securing the scrap portion of the grid castings on said conveyor, means for severing the grids from the scrap and for raising said scrap, means for removing said grids while said scrap is raised, and means associated with the press for lowering said scrap upon said retaining means carried by the conveyor.

12. In apparatus of the character set forth, a conveyor, retaining prongs carried by said conveyor and adapted to engage openings in the scrap portion of grid castings, means for severing the grids from the scrap and for raising said scrap on the prongs, means for removing said grids while the scrap is raised, means associated with the press for lowering said scrap upon said prongs, and means for actuating said conveyor to carry the castings to said severing means and the scrap forward after the separating operation.

13. In combination with a press having an inclined platform and adapted to cut out grids equipped with lateral projections, guide means carried by the lower edge portions of said platform and adapted to engage the lateral projections of the grids, and spaced means aligned with said guides but extending inwardly thereof so as to engage and support the lateral projections of the grids as the grids, after leaving the platform, swing to vertical position.

HARRY H. HENRY.
RICHARD MILLENAAR.